United States Patent Office.

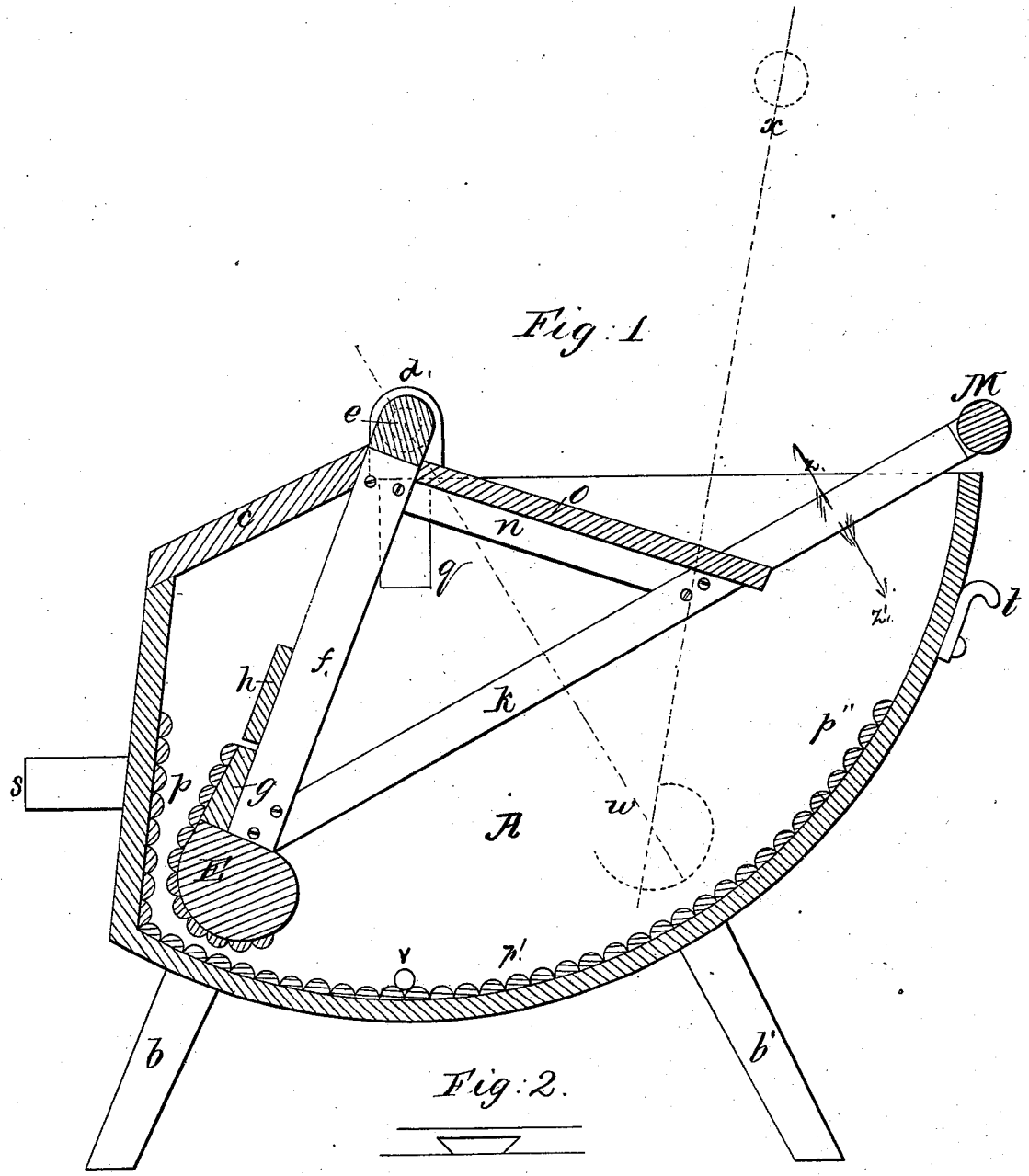

ALEXANDER R. CAMPBELL, OF CHELTENHAM, MISSOURI, ASSIGNOR TO HIMSELF AND JOHN B. BOMPART.

Letters Patent No. 70,693, dated November 12, 1867.

IMPROVED WASHING MACHINE.

*The Schedule referred to in these Letters Patent and making part of the same.*

TO ALL WHOM IT MAY CONCERN:

Be it known that I, ALEXANDER R. CAMPBELL, of Cheltenham, county of St. Louis, State of Missouri, have invented a new and useful Improved Washing Machine, of which the following is a full, clear, and exact description, reference being had to the annexed drawing, making a part of this specification, in which—

Figure 1 represents a sectional elevation of my invention.

Figure 2 represents a detail of same, hereinafter described.

Similar letters indicate like parts.

It consists of a wooden box, A, resting upon four legs, two of which are shown at $b$ $b'$, having its sides and one end square, while the other makes a circle with the bottom. The top is partially covered by a fixed cover, $c$, at the termination of which are placed two standards, one of which is shown at $d$, which serve as the bearings for a rock-shaft, $e$, from which extend two radial dash arms, of which one is seen at $f$, to whose extremities is attached a semicircular dasher, E, having a corrugated surface, the corrugation being extended over the dash-board $g$, while above $g$, and separated from it by a slight opening, is another dash-board, $h$, with a smooth surface. From the extremity of the dash-arms extend two shafts, one of which is seen at $k$, having their ends connected by the cross-bar M, forming the handle. Two braces, one of which is shown at $n$, connect these shafts and the dash-arms, and upon them is placed a cover, $o$, which, like the dasher and dash-boards, extends across the box from side to side, just space enough being left to allow them to move freely. The length of the dash-arms is such that there is left only space enough between the dasher and the circular bottom and side of the box to allow the dasher to work freely, while the shafts are fixed at such an angle as will prevent the dasher from striking too hard against the square end of the box. The sides of the box are smooth, but the two ends and the bottom are corrugated, as shown at $p$ $p'$ $p''$. The standards being made to slide in dove-tailed slots, one of which is shown at $q$, fig. 1, and in fig. 2, are easily removed whenever it is desired to take out the dasher and frame for any purpose. Handles, two of which are shown at $s$ and $t$, are fixed on the box, and at $v$ there is a vent for the water to escape.

When the machine is to be used, move the dasher from the box by raising the cross-bar M, the dasher swinging freely on the rock-shaft, and place the articles to be washed with the water in the box. As the dasher will not pass over the clothes, on account of the small space between it and the bottom, it will be stopped by them, and assume the position, for instance, shown by the red line $w$, while the shafts take that indicated by the red line $x$. Now, by working the handle up and down in the direction indicated by the arrows $z$ $z'$, the clothes will first be pressed against the square end of the box by the dasher, and then, when this retreats, the suction will draw the clothes back, the clothes being alternately filled with water by the one operation and deprived of the water by the other, and in both cases obtaining the benefit of the corrugated bottom by being drawn back and forth over it.

The advantages of my invention consist in entirely obviating any risk of tearing the clothes, however delicate, since the only force acting upon them is the pressure of the dasher and the suction of the water, there being no rubbing except such as is caused by their passing back and forth over the corrugations. By the pressure it is evident that the clothes are more thoroughly cleansed than they would be by rubbing, since the water is forced through them, taking with it all impurities. The dasher being so hung that it will fall by its own weight, the labor of operating the machine is very slight. No metal being used in the construction of the machine except the brass screws which hold the various parts, there is no liability to injury from rust.

What I claim as my invention, and desire to secure by Letters Patent, is—

The rock-shaft $e$, semicircular corrugated dasher E, corrugated dash-board $g$, smooth dash-board $h$, shafts $k$, cross-bar M, braces $n$, cover $o$, standards $d$, dove-tailed slots $q$, and the corrugated circular and square ends of a washing machine, all in combination, when constructed and operating substantially as shown and specified.

ALEX. R. CAMPBELL.

Witnesses:
SAM'L S. BOYD,
HENRY T. CARTER.